United States Patent Office 3,632,642
Patented Jan. 4, 1972

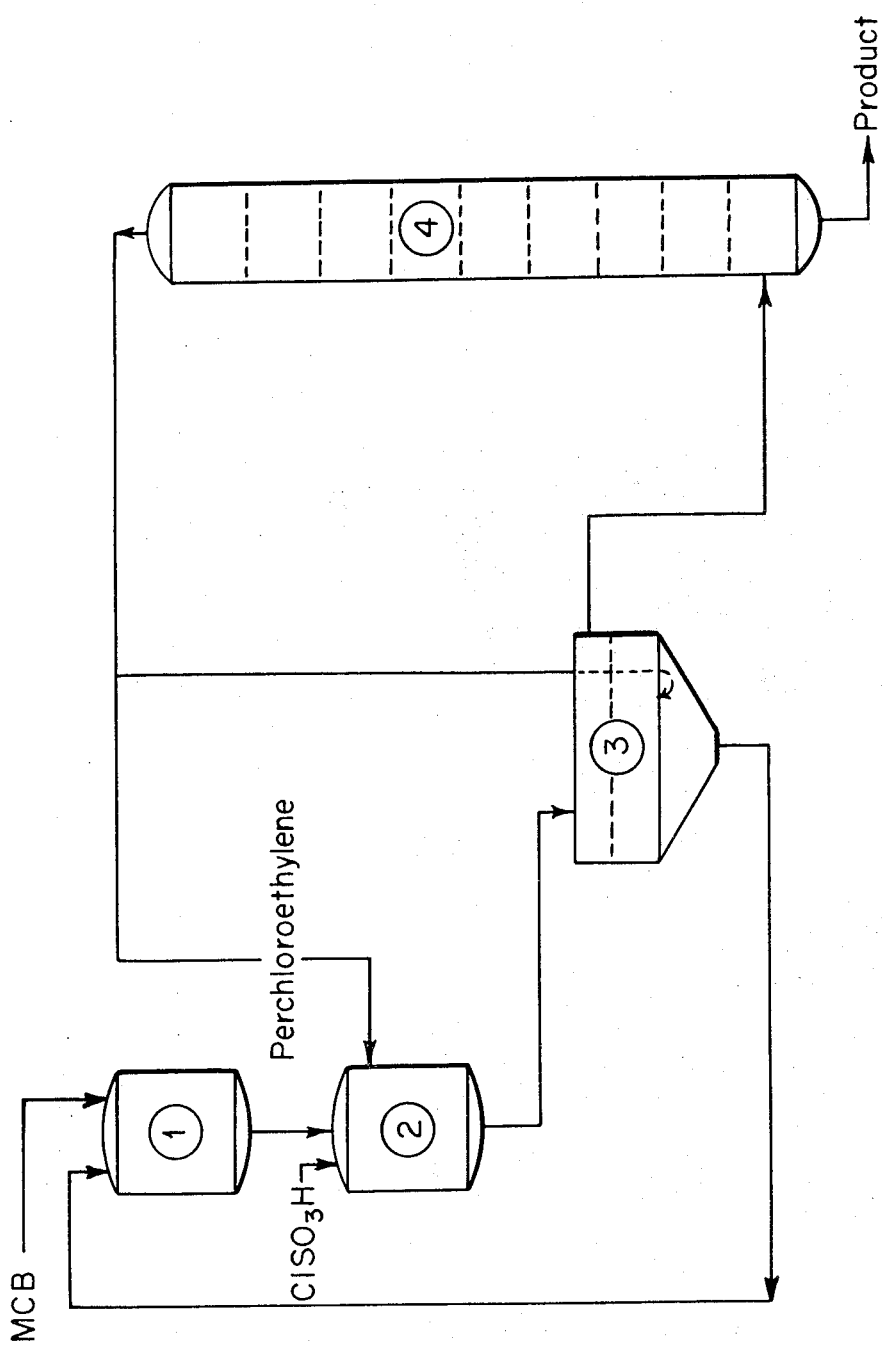

3,632,642
PRODUCTION OF ARYLSULFONYL CHLORIDES
Jacob Rosin, Maplewood, and Frank S. Ang, Kearney,
N.J., assignors to Chris-Craft Industries, Inc.
Filed Oct. 7, 1968, Ser. No. 765,486
Int. Cl. C07c 143/70
U.S. Cl. 260—543 R                                   6 Claims

ABSTRACT OF THE DISCLOSURE

Arylsulfonyl chlorides may be produced in almost quantitative yields by the chlorination of an arylsulfonic acid with chlorosulfonic acid in the presence of certain halogenated hydrocarbon solvents (i) which are inert to chlorosulfonic acid and sulfuric acid, (ii) which are substantially non-solvents for and immiscible with sulfuric acid, (iii) which are solvents for the resultant arylsulfonyl chloride, and (iv) which are very limited solvents for the arylsulfonic acid and for chlorosulfonic acid. The process improvement in this reaction is accomplished, *firstly*, by completely extracting the arylsulfonyl chloride from the chlorination reaction mixture in the organic solvent while maintaining a low concentration of arylsulfonyl chloride in the solvent, thereby displacing the equilibrium of the chlorination reaction toward formation of the arylsulfonyl chloride and minimizing the coextraction of arylsulfonic acid and chlorosulfonic acid; and *secondly*, by codistilling substantially all of the halogenated hydrocarbon solvent and chlorosulfonic acid from the resultant extraction mixture, leaving a residue comprising the sulfonyl chloride. The process is described in detail with respect to the production of p-chlorobenzenesulfonyl chloride, which is an intermediate in the manufacture of bis-(p-chlorophenyl) sulfone which, in turn, is the commercially important monomer used for many thermoplastic polysulfone polymers.

INTRODUCTION

This application relates to the production of arylsulfonyl chlorides by the chlorination of the arylsulfonic acid with chlorosulfonic acid. The invention provides an improved process for the production of arylsulfonyl chlorides and is particularly applicable to the production of p-chlorobenzenesulfonyl chloride.

Arylsulfonyl chlorides are important intermediates for the manufacture of many commercially important products, including many dyestuffs, pharmaceuticals, and polymers. By way of illustration, bis-(p-chlorophenyl) sulfone, which is a commercially important monomer in the manufacture of many thermoplastic polysulfone polymers, is produced from monochlorobenzene in a sequence of reactions in which (1) monochlorobenzene is sulfonated with sulfuric acid to form p-chlorobenzenesulfonic acid, (2) the p-chlorobenzenesulfonic acid is chlorinated with chlorosulfonic acid to form the corresponding p-chlorobenzenesulfonyl chloride, and (3) the p-chlorobenzenesulfonyl chloride is condensed with monochlorobenzene in the presence of a Friedel-Crafts catalyst (generally aluminum chloride) to form the bis-(p-chlorophenyl) sulfone. The stoichiometry of this reaction sequence is as follows:

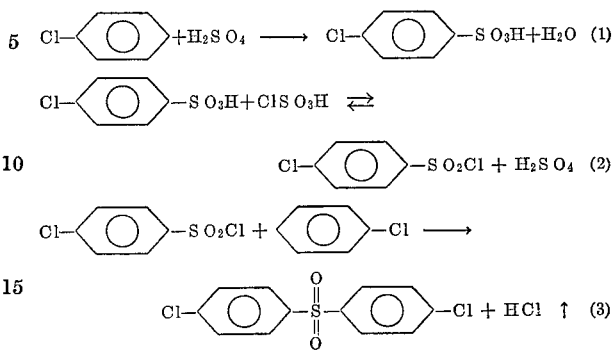

Because the chlorination of p-chlorobenzenesulfonic acid with chlorosulfonic acid reaches an equilibrium between the resultant p-chlorobenzenesulfonyl chloride and sulfuric acid as shown in Equation 2 of the foregoing reaction sequence, a large excess of chlorosulfonic acid is generally used to displace the equilibrium toward formation of p-chlorobenzenesulfonyl chloride, even under which conditions the yields of the arylsulfonyl chloride are less than quantitative. The classic method of producing p-chlorobenzenesulfonyl chloride requires 4.13 moles of chlorosulfonic acid per mole of p-chlorobenzenesulfonic acid, yielding only 81% of theory of the p-chlorobenzenesulfonyl chloride. Although thionyl chloride or phosphorous trichloride may be used as a chlorination reagent to obtain higher yields of the arylsulfonyl chloride, the much higher costs of these chlorination reagents do not justify their use in favor of the less expensive chlorosulfonic acid.

STATEMENT OF THE INVENTION

During an extensive investigation into the chlorination of arylsulfonic acids with chlorosulfonic acid, we found that when the arylsulfonic acid is reacted with chlorosulfonic acid in the presence of certain organic solvents (i) which are inert to chlorosulfonic acid and sulfuric acid, (ii) which are substantially non-solvents for and immiscible with sulfuric acid, (iii) which are solvents for the resultant arylsulfonyl chloride, and (iv) which are very limited solvents for the arylsulfonic acid and for chlorosulfonic acid, it is possible to displace the equilibrium of the chlorination reaction toward formation of the arylsulfonyl chloride by substantially completely extracting the arylsulfonyl chloride from the chlorination reaction mixture into the organic solvent.

Based on this discovery, the invention contemplates the improvement, in a process for the production of arylsulfonyl chlorides, in which an arylsulfonic acid is reacted with chlorosulfonic acid, which comprises:

(a) Chlorinating an arylsulfonic acid with chlorosulfonic acid and displacing the equilibrium of the chlorination reaction toward formation of the arylsulfonyl chloride by substantially completely extracting the arylsulfonyl chloride from the chlorination reaction mixture into an organic solvent (i) which is inert to chlorosulfonic acid and sulfuric acid, (ii) which is substantially a non-solvent for and immiscible with sulfuric acid, (iii) which is a solvent for the resultant arylsulfonyl chloride, and (iv) which is a very limited solvent for the arylsulfonic acid and for chlorosulfonic acid;

(b) Separating the chlorination reaction mixture into (i) an organic phase comprising a solution in the organic solvent of the arylsulfonyl chloride and minor amounts of unreacted arylsulfonic acid and unreacted chlorosulfonic acid, and (ii) an inorganic phase comprising essentially sulfuric acid and some unreacted chlorosulfonic acid; and (c) Recovering the arylsulfonyl chloride from the organic phase.

This process may be used to produce a large number of arylsulfonyl chlorides, and is particularly applicable to the production of p-chlorobenzenesulfonyl chloride.

THE BASIC PARAMETERS OF THE PROCESS

The arylsulfonic acid is reacted with chlorosulfonic acid ($ClSO_3H$), preferably in approximately equimolar quantities, and the equilibrium of the chlorination reaction is displaced toward formation of the arylsulfonyl chloride by substantially completely extracting the arylsulfonyl chloride from the chlorination reaction mixture into an organic solvent (i) which is inert to chlorosulfonic acid and sulfuric acid, (ii) which is substantially a non-solvent for and immiscible with sulfuric acid, (iii) which is a solvent for the resultant arylsulfonyl chloride, and (iv) which is a very limited solvent for the arylsulfonic acid and for chlorosulfonic acid. Many organic solvents have been found to meet these four critical criteria, the most important class of which organic solvents are the halogenated hydrocarbons. By far the most efficient organic solvent for displacing the equilibrium of the chlorination reaction toward formation of the arylsulfonyl chloride are those halogenated hydrocarbons having a boiling point which is fairly close to that of chlorosulfonic acid so that both the solvent as well as any unreacted chlorosulfonic acid concurrently extracted from the chlorination reaction mixture may be separated from the arylsulfonyl chloride by distillation. One such halogenated hydrocarbon is perchloroethylene, which readily dissolves the arylsulfonyl chloride but is a poor solvent for the arylsulfonic acid and chlorosulfonic acid and virtually a non-solvent for sulfuric acid. The boiling point of perchloroethylene (B.P. 121° C.) is sufficiently close to that of chlorosulfonic acid (B.P. 158° C.) so that whatever chlorosulfonic acid is extracted by perchloroethylene during the extraction of the arylsulfonyl chloride from the chlorination reaction mixture is ultimately codistilled with the perchloroethylene during recovery of the arylsulfonyl chloride and the distillate (perchloroethylene and chlorosulfonic acid) recycled for reuse in the extraction of further arylsulfonyl chloride from the chlorination reaction mixture.

As a practical matter, the chlorination reaction may be carried out by various techniques depending upon production requirements and the availability of equipment. One such technique involves reacting the arylsulfonic acid and chlorosulfonic acid and then subsequently extracting the chlorination reaction mixture with the organic solvent, which extraction causes the equilibrium of the chlorination reaction to be displaced toward formation of additional arylsulfonyl chloride. Another technique involves conducting the chlorination reaction initially in the presence of the organic solvent so that the arylsulfonyl chloride is selectively extracted from the reaction mixture as quickly as it forms. A more efficient variant of the latter technique involves conducting the chlorination reaction initially in the presence of the organic solvent and also extracting the sulfuric acid phase of the reaction mixture with additional solvent, which extraction is combined with the initially formed organic phase so that the arylsulfonyl chloride is substantially completely extracted into the solvent.

Whatever the technique used, chlorination of the arylsulfonic acid with chlorosulfonic acid must be conducted in such manner that the equilibrium of the chlorination reaction is displaced toward formation of the arylsulfonyl chloride by substantially completely extracting the arylsulfonyl chloride from the chlorination reaction mixture into the organic solvent and minimizing insofar as possible the coextraction of arylsulfonic acid and chlorosulfonic acid by the organic solvent.

Based on our experience, we have observed that the presence of relatively high concentrations of arylsulfonyl chloride in the organic solvent (such as perchloroethylene) tends to increase the solubility of arylsulfonic acid and of chlorosulfonic acid in such organic solvent. Consequently, the concentration of arylsulfonyl chloride in the organic solvent should be maintained at a relatively low level to minimize coextraction of arylsulfonic acid and chlorosulfonic acid. We found that (a) by continuously adding the chlorination reaction mixture to the "heel" remaining from the prior extraction of another batch (i.e., which "heel" comprises essentially sulfuric acid), (b) by simultaneously continuously introducing the organic solvent into the bottom of this "heel," (c) by simultaneously continuously removing the upper organic layer from the "heel" and transferring such removed organic solution to an evaporator or distillation tower and (d) by simultaneously distilling the organic solvent (which necessairily codistills most if not all of the chlorosulfonic acid which may be extracted by the solvent) and using this distillate as the organic solvent which is introduced into the bottom of the "heel," it is possible to maintain a sufficiently low concentration of arylsulfonyl chloride in the organic solvent to minimize the coextraction of arylsulfonic acid and chlorosulfonic acid and to virtually completely suppress the coextraction of any sulfuric acid by the organic solvent. Under these conditions, the entire chlorination reaction mixture may be separated into (i) an organic phase comprising a solution in the organic solvent of the arylsulfonyl chloride, which solution invariably contains some unreacted arylsulfonic acid and probably contains some arylsulfonic anhydride, and (ii) an inorganic phase comprising essentially sulfuric acid and invariably containing some unreacted chlorosulfonic acid. After removal of the solvent by simple distillation, the residual arylsulfonyl chloride (containing unreacted arylsulfonic acid and probably some arylsulfonic anhydride) is ready for use as a reactant or may be purified by distillation. The inorganic phase comprising essentially sulfuric acid and some unreacted chlorosulfonic acid may be used to sulfonate arene to form the arylsulfonic acid.

The process of the invention may be used to produce any arylsulfonyl chloride which either has been or normally may be prepared by the reaction of an arylsulfonic acid chlorosulfonic acid. By properly selecting the reaction conditions and the organic solvent, practically quantitative yields of the arylsulfonyl chloride may be obtained.

PRODUCTION OF p-CHLOROBENZENESULFONYL CHLORIDE

The applicability of the process of the invention to the production of p-chlorobenzenesulfonyl chloride is described below with reference to the accompanying flowsheet, which schematically illustrates an integrated, economically efficient process for the production of p-chlorobenzenesulfonyl chloride from monochlorobenzene:

p-Chlorobenzenesulfonic acid, produced in a sulfonation reactor 1 by sulfonating monochlorobenzene with sulfuric acid, is reacted with an equimolar amount of chlorosulfonic acid at a temperature of 80° C. for ½ hour in a sulfonyl chloride reactor 2. To move the equilibrium of the chlorination reaction from about 66% to about 80% of the theoretical amount of p-chlorobenzenesulfonyl chloride, 250-ml. of perchloroethylene per gram-equivalent of p-chlorobenzenesulfonic acid is added to the sulfonyl chloride reactor 2 and the reaction mixture heated at a temperature of 80° C. for an additional hour, following which the chlorination reaction mixture is continuously discharged from the sulfonyl chloride reactor 2 into an extractor 3 containing the "heel" of a previously extracted batch. This "heel" comprises essentially sulfuric acid and small amounts of chlorosulfonic acid.

In the extractor 3, the chlorination reaction mixture separates into (i) an upper organic phase which is essentially a perchloroethylene solution of p-chlorobenzenesulfonyl chloride containing some unreacted p-chlorobenzenesulfonic acid and some unreacted chlorosulfonic acid, and (ii) a lower inorganic phase comprising essentially sulfuric acid and a minor amount of unreacted chlorosulfonic acid. Perchloroethylene is continuously introduced below the surface of the inorganic phase (the "heel") so that the sulfuric acid is continually being extracted with perchloroethylene which rises to the top of the extractor 3 where it enters and becomes part of the organic phase. Periodically, part of the sulfuric acid from the lower phase in the extractor 3 is recycled to the sulfonation reactor 1 for use in producing additional p-chlorobenzenesulfonic acid.

The upper organic phase (containing the perchloroethylene extraction of the lower sulfuric acid phase) in the extractor 3 continuously overflows into a distillation tower 4, where perchloroethylene is distilled off at a temperature of up to about 150° C. and the perchloroethylene distillate (containing codistilled chlorosulfonic acid which has been coextracted) recycled partly to the sulfonyl chloride reactor 2 and partly below the surface of the lower sulfuric acid phase in the extractor 3.

Assuming that a mole of p-chlorobenzenesulfonic acid was originally used in the sulfonyl chloride reactor 2, then the bottoms in the distillation tower 4 consist of about 0.8 mole of p-chlorobenzenesulfonyl chloride together with about 0.2 mole of p-chlorobenzenesulfonic acid and, in all probability, small amounts of p-chlorobenzenesulfonic anhydride which may form during the distillation of the perchloroethylene. The crude p-chlorobenzenesulfonyl chloride from the distillation tower 4 may be used directly to produce bis-(p-chlorophenyl) sulfone in accordance with the process described in copending application Serial No. 765,594 filed Oct. 7, 1968, entitled "Production of Aromatic Sulfones," which process requires the presence of arylsulfonic acid in the arylsulfonyl chloride during subsequent condensation with an arene to form the corresponding aromatic sulfone.

Alternatively, two moles of chlorosulfonic acid per mole of p-chlorobenzenesulfonic acid may be used in the chlorination reaction in the sulfonyl chloride reactor 2, in which case the yield of p-chlorobenzenesulfonyl chloride recovered from the organic phase will be almost quantitative (based on the amount of p-chlorobenzenesulfonic acid) but the inorganic phase will contain a proportionately larger amount of chlorosulfonic acid. For maximum economy, the inorganic phase (containing both sulfuric and chlorosulfonic acid) should be recycled back to the sulfonation reactor 1 where it is used to produce additional p-chlorobenzenesulfonic acid.

We claim:

1. In a process for the production of an arylsulfonyl chloride, in which an arylsulfonic acid is reacted with at least an equimolar amount of chlorosulfonic acid in the presence of a halogenated hydrocarbon solvent characterized by being (i) inert to chlorosulfonic acid and sulfuric acid, (ii) a nonsolvent for and immiscible with sulfuric acid, (iii) a solvent for the resultant arylsulfonyl chloride, and (iv) a very limited solvent for the arylsulfonic acid and for chlorosulfonic acid, the improvement which essentially comprises (a) completely extracting the arylsulfonyl chloride from the chlorination reaction mixture into the halogenated hydrocarbon solvent while simultaneously and continuously maintaining a low concentration of arylsulfonyl chloride in the solvent by introducing additional solvent, thereby displacing the equilibrium of the chlorination reaction toward formation of the arylsulfonyl chloride and minimizing the coextraction of arylsulfonic acid and chlorosulfonic acid into said solvent; and
   (b) codistilling substantially all of the halogenated hydrocarbon solvent and chlorosulfonic acid from the resultant extraction mixture, leaving a residue comprising the arylsulfonyl chloride.

2. A process for the production of an arylsulfonyl chloride according to claim 1, in which
   (a) the chlorination reaction mixture is allowed to separate in an extractor into (1) an organic phase comprising a solution in the halogenated hydrocarbon solvent of the arylsulfonyl chloride and unreacted arylsulfonic acid and unreacted chlorosulfonic acid, and (2) an inorganic phase comprising essentially sulfuric acid and some unreacted chlorosulfonic acid;
   (b) the inorganic phase is extracted with halogenated hydrocarbon solvent and the resultant solvent extraction is allowed to combine with the organic phase; and
   (c) the combined organic phase is removed from the extractor at approximately the same rate as halogenated hydrocarbon solvent is introduced into the inorganic phase as an extractant, thereby completely extracting the arylsulfonyl chloride formed by the chlorination reaction into the combined organic phase and minimizing the coextraction of arylsulfonic acid and chlorosulfonic acid into the combined organic phase.

3. A process for the production of an arylsulfonyl chloride in accordance with claim 1, in which the halogenated hydrocarbon solvent is perchloroethylene.

4. In a process for the production of p-chlorobenzenesulfonyl chloride, in which p-chlorobenzenesulfonic acid is reacted with at least an equimolar amount of chlorosulfonic acid, the improvement which essentially comprises
   (a) conducting the chlorination reaction in the presence of perchloroethylene;
   (b) completely extracting the p-chlorobenzenesulfonyl chloride from the chlorination reaction mixture into perchloroethylene while simultaneously and continuously maintaining a low concentration of p-chlorobenzenesulfonyl chloride in the solvent by introducing additional solvent, thereby displacing the equilibrium of the chlorination reaction toward formation of p-chlorobenzenesulfonyl chloride and minimizing the coextraction of p-chlorobenzenesulfonic acid and chlorosulfonic acid into the perchloroethylene; and
   (c) codistilling substantially all of the perchloroethylene and chlorosulfonic acid from the resultant extraction mixture, leaving a residue comprising the p-chlorobenzenesulfonyl chloride.

5. A process for the production of p-chlorobenzenesulfonyl chloride according to claim 4, in which
   (a) the chlorination reaction mixture is allowed to separate in an extractor into (1) an organic phase comprising a solution in perchloroethylene of the p-chlorobenzenesulfonyl chloride and unreacted p-chlorobenzenesulfonic acid and unreacted chlorosulfonic acid, and (2) an inorganic phase comprising essentially sulfuric acid and some unreacted chlorosulfonic acid;
   (b) the inorganic phase is extracted with perchloroethylene and the resultant solvent extraction is allowed to combine with the organic phase; and
   (c) the combined organic phase is removed from the extractor at approximately the same rate as perchloroethylene is introduced into the inorganic phase as an extractant, thereby completely extracting the p-chlorobenzenesulfonyl chloride formed by the chlorination reaction into the combined organic phase and minimizing the coextraction of p-chlorobenzenesulfonic acid and chlorosulfonic acid into the combined organic phase.

6. A process for the production of p-chlorobenzenesulfonyl chloride according to claim 5, in which the codistillate of perchloroethylene and chlorosulfonic acid is reused partly in the chlorination reaction and partly in the extraction of the inorganic phase produced by the chlorination reaction.

References Cited
UNITED STATES PATENTS

| | | | |
|---|---|---|---|
| 3,364,258 | 1/1968 | De Jong | 260—543 |
| 3,108,137 | 10/1963 | Barton | 260—543 |

LORRAINE A. WEINBERGER, Primary Examiner

E. J. GLEIMAN, Assistant Examiner

U.S. Cl. X.R.

260—607 A